(12) United States Patent
Sim et al.

(10) Patent No.: US 12,101,463 B2
(45) Date of Patent: Sep. 24, 2024

(54) METHOD AND APPARATUS FOR INTRA PREDICTION BASED ON DERIVING PREDICTION MODE

(71) Applicants: Hyundai Motor Company, Seoul (KR); Kia Motors Corporation, Seoul (KR); Kwangwoon University Industry-Academic Collaboration Foundation, Seoul (KR)

(72) Inventors: Dong Gyu Sim, Seoul (KR); Sea Nae Park, Seoul (KR); Jong Seok Lee, Seoul (KR); Seung Wook Park, Gyeonggi-do (KR); Wha Pyeong Lim, Gyeonggi-do (KR)

(73) Assignees: Hyundai Motor Company, Seoul (KR); Kia Motors Corporation, Seoul (KR); Kwangwoon University Industry-Academic Collaboration Foundation, Seoul (KR)

(*) Notice: Subject to any disclaimer, the term of this patent is extended or adjusted under 35 U.S.C. 154(b) by 339 days.

(21) Appl. No.: 17/440,567

(22) PCT Filed: Mar. 20, 2020

(86) PCT No.: PCT/KR2020/003836
§ 371 (c)(1),
(2) Date: Sep. 17, 2021

(87) PCT Pub. No.: WO2020/190077
PCT Pub. Date: Sep. 24, 2020

(65) Prior Publication Data
US 2022/0150470 A1 May 12, 2022

(30) Foreign Application Priority Data

Mar. 20, 2019 (KR) .................. 10-2019-0031727
Mar. 20, 2020 (KR) .................. 10-2020-0034277

(51) Int. Cl.
H04N 19/105 (2014.01)
H04N 19/132 (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/46* (2014.11)

(58) Field of Classification Search
CPC .. H04N 19/176; H04N 19/119; H04N 19/105; H04N 19/70; H04N 19/46;
(Continued)

(56) References Cited

U.S. PATENT DOCUMENTS

2019/0379891 A1  12/2019  Moon et al.
2020/0236362 A1* 7/2020  Lee ..................... H04N 19/137

FOREIGN PATENT DOCUMENTS

KR   10-2018-0040824 A   4/2018
KR   10-2018-0041577 A   4/2018
(Continued)

OTHER PUBLICATIONS

E. Mora et al., "CE3-related: Decoder-side Intra Mode Derivation", Joint Video Experts Team (JVET), 12th Meeting: Macao, CN, Oct. 3-12, 2018.
(Continued)

*Primary Examiner* — Masum Billah
(74) *Attorney, Agent, or Firm* — Fox Rothschild LLP

(57) ABSTRACT

The present embodiment, for an intra prediction method used by an intra prediction device, provides the method comprising: decoding, from a bitstream, mode information indicating use of a prediction derivation mode for a prediction mode block; deriving an intra prediction mode of each pixel group from intra prediction modes of pre-reconstructed reference pixels at a plurality of positions near the prediction
(Continued)

mode block for each pixel group including one or more pixels in the prediction mode block; and intra-predicting the pixels in each pixel group using the intra prediction mode of each pixel group.

16 Claims, 12 Drawing Sheets

(51) Int. Cl.
    *H04N 19/159*     (2014.01)
    *H04N 19/176*     (2014.01)
    *H04N 19/46*     (2014.01)

(58) Field of Classification Search
    CPC ...... H04N 19/96; H04N 19/11; H04N 19/124; H04N 19/103
    USPC .......................................................... 375/240
    See application file for complete search history.

(56) References Cited

FOREIGN PATENT DOCUMENTS

| KR | 20180041577 A | 4/2018 | |
|---|---|---|---|
| KR | 10-2018-0085526 A | 7/2018 | |
| WO | 2018/054269 A1 | 3/2018 | |
| WO | WO-2018070568 A1 * | 4/2018 | ........... H04N 19/105 |
| WO | WO-2018135885 A1 * | 7/2018 | ........... H04N 19/103 |

OTHER PUBLICATIONS

Office Action for Chinese Patent Application No. 2020800374431 from China National Intellectual Property Administration, dated May 16, 2024, English translation, 6 pages.

* cited by examiner (a)

(b)

(a)

(b)

Corresponding luma reconstructed samples

METHOD AND APPARATUS FOR INTRA PREDICTION BASED ON DERIVING PREDICTION MODE

TECHNICAL FIELD

The present invention relates to an intra prediction method used in an image encoding and decoding apparatus and, more particularly, to an intra-prediction method that derives an intra prediction mode of a current block with reference to an intra prediction mode of a previously reconstructed neighboring block.

BACKGROUND

The content described in this section merely provides background information about the present disclosure and does not constitute the related art Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the image size, resolution, and frame rate are gradually increasing, and accordingly the amount of data to be encoded is also increasing. Accordingly, a new compression technique having better encoding efficiency and higher image quality than the existing compression technique is required.

SUMMARY

Technical Problem

The present disclosure is directed to providing an intra prediction device and method for deriving an intra prediction mode of a current block with reference to an intra prediction mode of a previously reconstructed neighboring block, performing intra prediction using the derived intra prediction mode, and generating predicted samples for the current block.

Technical Solution

In accordance with one aspect of the present disclosure, for an intra prediction method used by an intra prediction device, provided is the method comprising: decoding, from a bitstream, mode information indicating use of a prediction derivation mode for a prediction mode block; deriving an intra prediction mode of each pixel group from intra prediction modes of pre-reconstructed reference pixels at a plurality of positions near the prediction mode block for each pixel group including one or more pixels in the prediction mode block; and intra-predicting the pixels in each pixel group using the intra prediction mode of each pixel group.

In accordance with another aspect of the present disclosure, provided is an intra prediction device comprising: an entropy decoding unit configured to decode, from a bitstream, mode information indicating use of a prediction derivation mode for a prediction mode block; a prediction mode derivation unit configured to derive an intra prediction mode of each pixel group from intra prediction modes of pre-reconstructed reference pixels at a plurality of positions near the prediction mode block for each pixel group including one or more pixels in the prediction mode block; and a predicted sample generation unit configured to perform intra prediction on the pixels in each pixel group using the intra prediction mode of each pixel group.

Advantageous Effects

As described above, according to embodiments, it is possible to improve the compression performance of the image encoding and decoding apparatus by providing an intra prediction device and method for deriving an intra prediction mode of a current block with reference to an intra prediction mode of a previously reconstructed neighboring block, performing intra prediction based on the derived intra prediction mode, and generating predicted samples for the current block.

DETAILED DESCRIPTION

Figure 1:
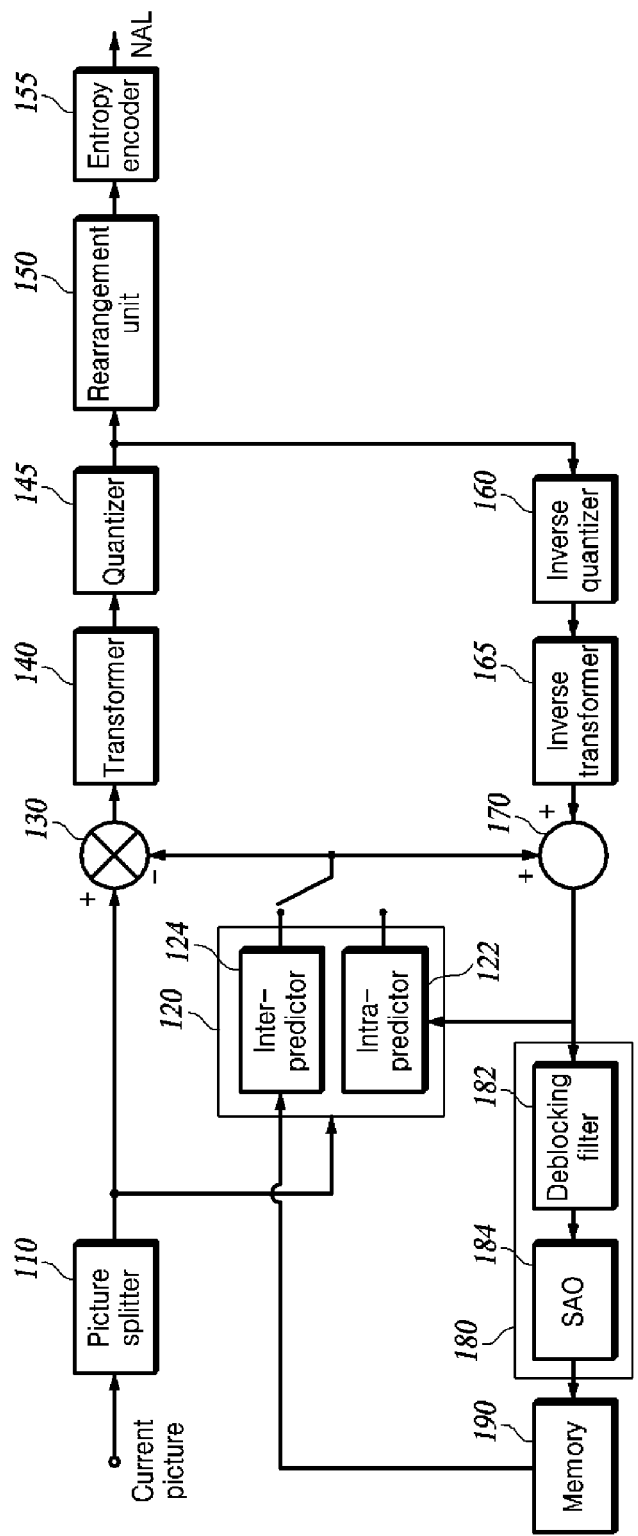
FIG. 1 is an exemplary block diagram of an image encoding apparatus capable of implementing techniques of the present disclosure.

Hereinafter, embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the embodiments, a detailed description of known functions and configurations incorporated herein will be omitted to avoid obscuring the subject matter of the embodiments.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
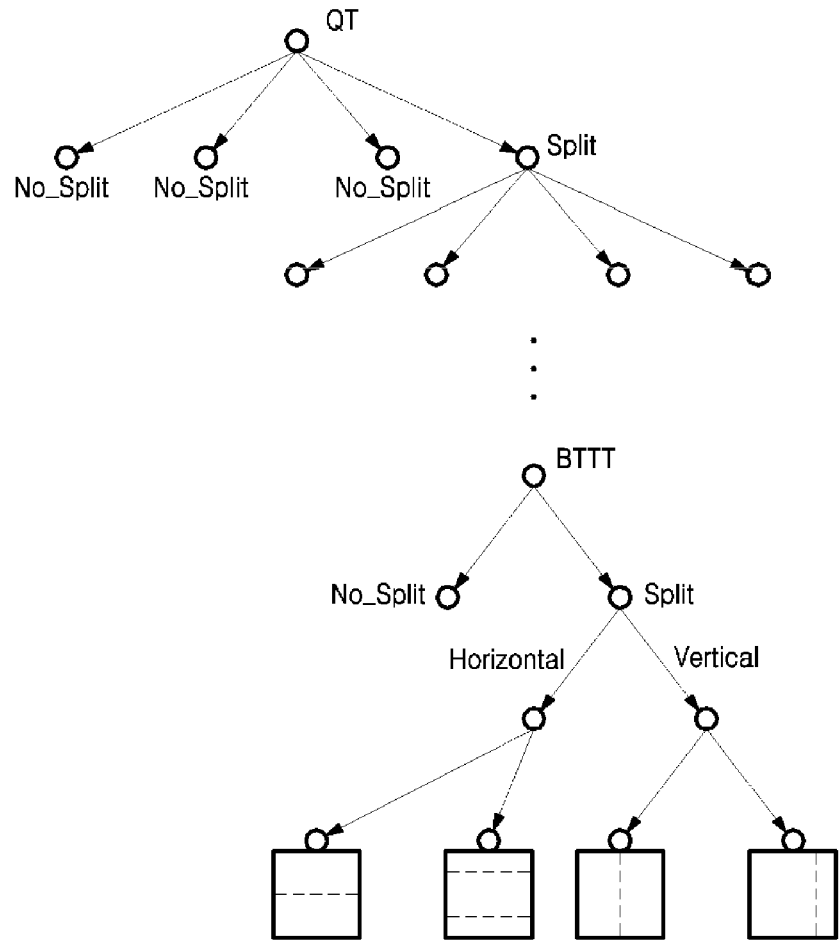
FIG. 2 is a diagram illustrating a method of partitioning a block using a Quad Tree, Binary Tree and Ternary Tree (QTBTTT) structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus.

Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

In general, each of the current blocks in a picture may be predictively coded. In general, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
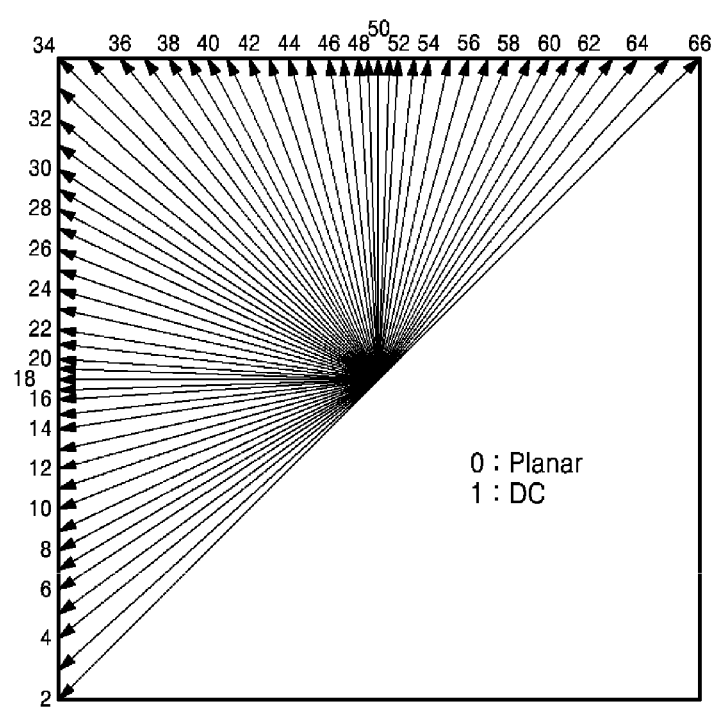
FIGS. 3A and 3B exemplarily show a plurality of intra prediction modes including a wide-angle intra prediction mode.

The intra-prediction unit 122 predicts pixels in the current block using pixels (reference pixels) positioned around the current block in the current picture including the current block. There is a plurality of intra-prediction modes according to the prediction directions. For example, as shown in FIG. 3A, the plurality of intra-prediction modes may include two non-directional modes, which include a planar mode and a DC mode, and 65 directional modes. Neighboring pixels and an equation to be used are defined differently for each prediction mode. The table below lists intra-prediction mode numbers and names thereof.

Figure 3B:
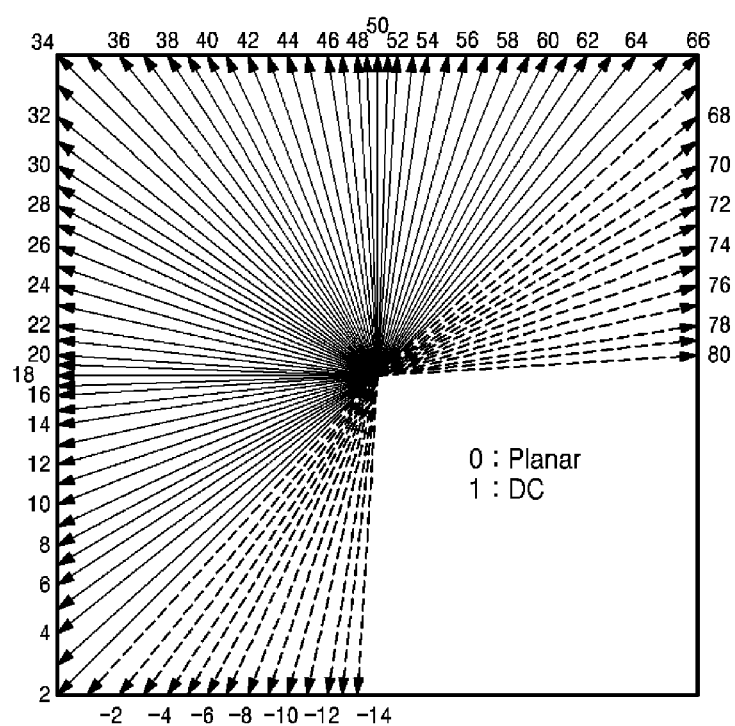

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of the width and height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with width greater than the height thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture which has been encoded and decoded earlier than the current picture, and generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 subtracts the prediction block generated by the intra-predictor 122 or the inter-predictor 124 from the current block to generate a residual block.

The transformer 140 transforms the residual signal in the residual block having pixel values in the spatial domain into transform coefficients in the frequency domain. The transformer 140 may transform residual signals in the residual block using the entire size of the residual block as a transformation unit. Alternatively, it may split the residual block into a plurality of subblocks, and perform the transformation using the subblock as a transform unit. Alternatively, the residual signals may be transformed by dividing the block into two subblocks, which are a transform region and a non-transform region, and using only the transform region subblock as a transform unit. Here, the transform region subblock may be one of two rectangular blocks having a size ratio of 1:1 based on the horizontal axis (or vertical axis). In this case, a flag (cu_sbt_flag) indicating that only subblocks have been transformed, directionality (vertical/horizontal) information (cu_sbt_horizontal_flag) and/or position information (cu_sbt_pos_flag) are encoded by the entropy encoder 155 and signaled to the video decoding apparatus. In addition, the size of the transform region subblock may have a size ratio of 1:3 based on the horizontal axis (or vertical axis). In this case, a flag (cu_sbt_quad_flag) distinguishing the corresponding splitting is additionally encoded by the entropy encoder 155 and signaled to the video decoding apparatus.

The transformer 140 may transform the residual block in the horizontal direction and the vertical direction individually. For transformation, various types of transform functions or transform matrices may be used. For example, pairs of transform functions for horizontal transformation and vertical transformation may be defined as a multiple transform set (MTS). The transformer 140 may select one pair of transform functions having the best transformation efficiency in the MTS, and transform the residual block in the horizontal and vertical directions, respectively. The information (mts_idx) on the transform function pair selected in the MTS is encoded by the entropy encoder 155 and signaled to the video decoding apparatus. The size of the transform block to which the MTS is applied may be limited to be within 32×32.

The quantizer 145 quantizes transform coefficients output from the transformer 140, and outputs the quantized transform coefficients to the entropy encoder 155.

The rearrangement unit 150 may reorganize the coefficient values for the quantized residual value.

The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 encodes the one-dimensional quantized transform coefficients output from the rearrangement unit 150 using uses various encoding techniques such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (information about a reference picture index and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184.

The deblocking filter 180 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
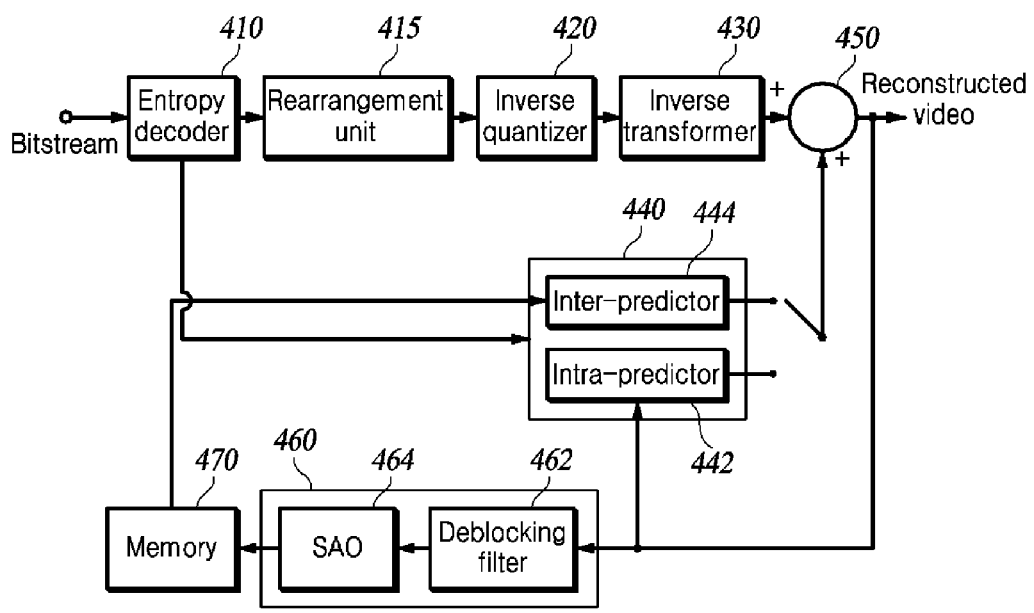
FIG. 4 is an exemplary block diagram of an image decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting, and extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, that is, information indicating a motion vector and a reference picture referred to by the motion vector.

The entropy decoder 410 also extracts information about quantized transform coefficients of the current block as information about the residual signal.

The rearrangement unit 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 inversely quantizes the quantized transform coefficients. The inverse transformer 430 inversely transforms the inversely quantized transform coefficients from the frequency domain to the spatial domain to reconstruct residual signals, thereby generating a residual block for the current block.

In addition, when the inverse transformer 430 inversely transforms only a partial region (subblock) of the transform block, it extracts a flag (cu_sbt_flag) indicating that only the subblock of the transform block has been transformed, the directionality (vertical/horizontal) information about the subblock (cu_sbt_horizontal_flag), and/or position information about the subblock (cu_sbt_pos_flag), and inversely transforms the transform coefficients of the subblock from the frequency domain to the spatial domain. Then, it reconstructs residual signals, and fills a region that is not inversely transformed with the value of "0" as a residual block, thereby generating the final residual block for the current block.

In addition, when the MTS is applied, the inverse transformer 430 determines transform functions or transform matrices to be applied in the horizontal and vertical directions, respectively, using the MTS information (mts_idx) signaled from the video encoding apparatus, and uses the determined transform functions to inversely transform the transform coefficients in the transform block in the horizontal and vertical directions.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410, and predicts the current block using the reference pixels around the current block according to the intra-prediction mode.

The inter-predictor 444 determines a motion vector of the current block and a reference picture referred to by the motion vector using the syntax element for the inter-prediction mode extracted from the entropy decoder 410, and predicts the current block based on the motion vector and the reference picture.

The adder 450 reconstructs the current block by adding the residual block output from the inverse transformer 430 and the prediction block output from the inter-predictor 444 or the intra-predictor 442. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 performs additional filtering on the reconstructed block after deblocking filtering to corresponding offsets so as to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

The present embodiment discloses a new intra prediction technique that can be implemented by the image encoding and decoding apparatus that has been described above. More specifically, an intra prediction device and method are provided for deriving an intra prediction mode of a current block with reference to an intra prediction mode of a previously reconstructed neighboring block and performing intra prediction using the derived intra prediction mode.

Figure 5:
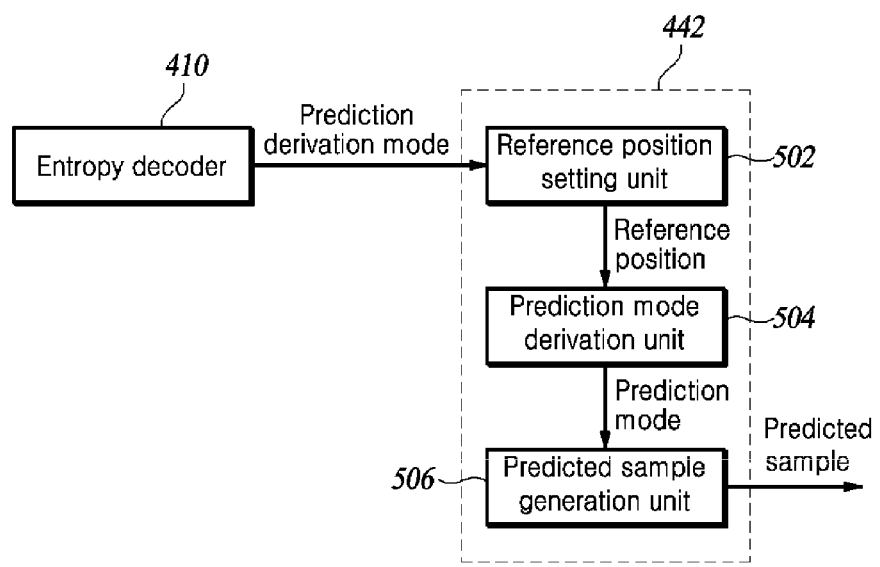
FIG. 5 is a block diagram of an intra prediction device according to an embodiment of the present invention.

FIG. 5 is a block diagram of an intra prediction device according to an embodiment of the present invention.

In an embodiment according to the present invention, an intra prediction device 500 derives a prediction mode with reference to an intra prediction mode of a previously reconstructed neighboring block without transmission of the prediction mode and performs intra prediction on a current block using the derived prediction mode. The intra prediction device 500 includes an entropy decoder 410 and an intra-predictor 442 included in a decoding apparatus.

An intra-predictor 122 included in an encoding apparatus operates similarly to the intra-predictor 442 included in the decoding apparatus, and thus the following description will focus on the intra-predictor 442 included in the decoding apparatus.

An intra prediction device 500 according to this embodiment uses a prediction derivation mode (hereinafter referred to as a derivation mode) to improve the efficiency of intra prediction.

The entropy decoder 410 decodes information on whether to apply the derivation mode to a prediction mode block from a bitstream. Here, the prediction mode block refers to a block unit in which prediction information including the derivation mode is transmitted. Hereinafter, for convenience of description, a current block indicates a prediction mode block.

In order to use the derivation mode, the encoding apparatus may transmit mode information regarding whether to use the derivation mode by using a bitstream, and the decoding apparatus may determine whether to apply the derivation mode using the corresponding information. The mode information may be information in the form of a flag indicating whether the prediction derivation mode is used. Alternatively, the mode information may be information in the form of an index for indicating one of a plurality of intra prediction modes that further includes the derivation mode as a new intra prediction mode.

When the derivation mode is applied, the intra-predictor 442 according to this embodiment derives an intra prediction mode for the prediction mode block and its sub-partitioning structure with reference to an intra prediction mode of a previously reconstructed neighboring block. The intra-predictor 442 may include all or some of a reference position setting unit 502, a prediction mode derivation unit 504, and a predicted sample generation unit 506.

Figure 6:
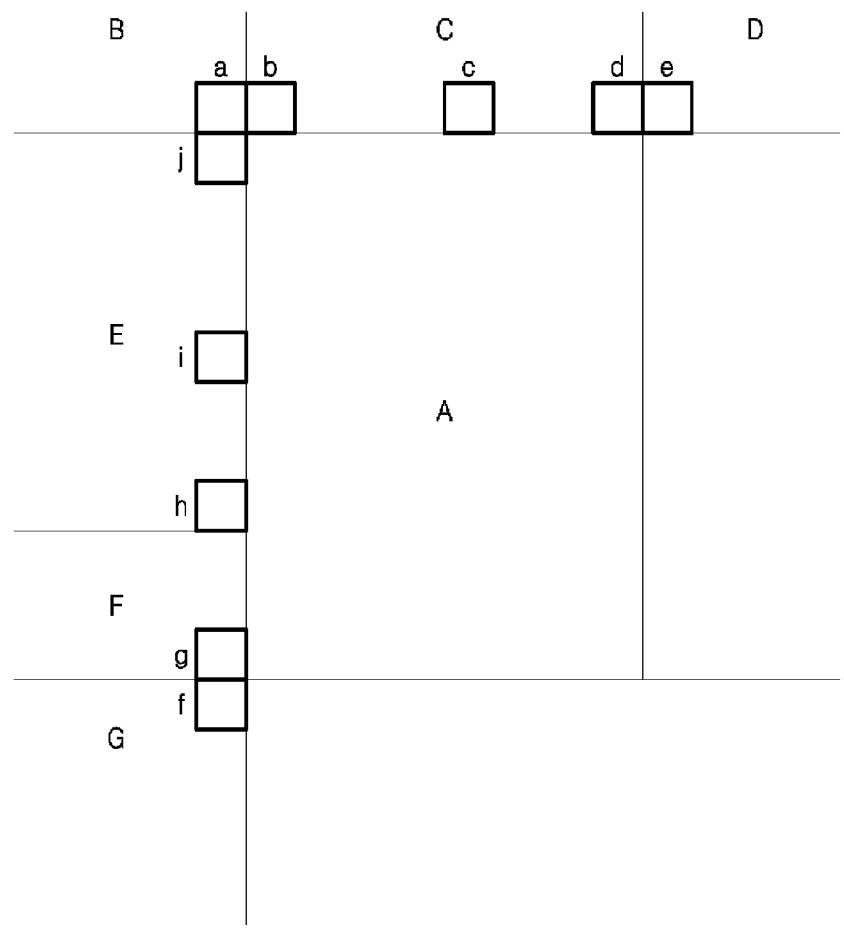
FIG. 6 is an exemplary diagram showing a reference position used to derive a prediction mode according to an embodiment of the present invention.

FIG. 6 is an exemplary diagram showing a reference position used to derive a prediction mode according to an embodiment of the present invention.

As shown in FIG. 6, a reference position setting unit 502 may use pixels (pixels a to j) of neighboring blocks (Blocks B to G) as a reference pixel in order to derive a prediction mode for prediction mode block A (M×N, M and N are natural numbers) and its sub-partitioning structure.

The reference position setting unit 502 may adaptively set a reference position according to a partitioning structure of a pre-constructed block near the prediction mode block. For example, when the top and left sides of prediction mode block A are partitioned into blocks B to G as shown in FIG. 6, pixels of predetermined positions of blocks B to G (e.g., pixels located in the lower right corner of each block) may be set as reference positions. That is, as shown in FIG. 6, the reference position setting unit 502 may use a predefined position (e.g., pixels a, d, g, or additionally pixel c at the center in the upper row, and pixel i or h at the center in the left column) as a reference position.

Also, the reference position setting unit 502 may use a predefined position (e.g., one of pixels a, b, and j, one of pixel d and e, one of pixels g and f, etc.) in a reference position group as a reference position. For example, in the case of the reference position group {a, b, j}, it is determined whether the reference pixel is a valid reference pixel in the order of a, b, and j, and the first valid position is set as the reference position. Here, a valid reference pixel may refer to a pixel in which intra prediction is used and which has a corresponding intra prediction mode. Also, in the case of a reference position group {d, e} or {g, f}, the reference position may be set in the order of d and e or in the order of g and f.

The reference position setting unit 502 may adaptively set a reference position according to the dimensions (the number of horizontal pixels, the number of vertical pixels, the product of the number of horizontal pixels and the number of vertical pixels, etc.) of the prediction mode block. For example, in the case of "number of horizontal pixels">"number of vertical pixels," more reference positions may be set on the top side, and conversely, more reference positions may be set on the left side. A preset number of reference positions may be determined from the predefined position as described above, and a reference position may be added at the center of a longer side.

Also, the reference position setting unit 502 may set the number of reference positions according to the product of the number of horizontal pixels and the number of vertical pixels and may use a set number of predefined positions as reference positions as described above.

The reference position setting unit 502 may set a reference position at a predetermined position according to an appointment between an encoding apparatus and a decoding apparatus.

As described above, the reference position setting unit 502 may determine a reference position using at least one of the dimensions of a prediction mode block, a position predetermined according to an appointment between an encoding apparatus and a decoding apparatus, and a partitioning structure of a block near a prediction mode block.

Meanwhile, alternatively, information on available reference positions may be transmitted from the encoding apparatus to the decoding apparatus. In this case, the reference position setting unit 502 determines reference positions using the received information.

When the derivation mode according to this embodiment is applied, the intra-predictor 442 may partition the prediction mode block into pixel groups including one or more pixels. Pixel groups including a plurality of pixels are collectively expressed as a partition block or a sub-block, and intra prediction may be performed in units of each partition block. Therefore, the prediction mode block in which the derivation mode is decoded may not have the same level as the block in which the intra prediction is performed.

According to the partitioning structure of the prediction mode block, the pixel group may be in the form of a block such as a square, a rectangle, or a triangle or in a block form of a line unit such as M×1 or 1×N. Meanwhile, the pixel groups obtained through the partitioning may have the same size and form.

In another embodiment of the present invention, the pixel group may include only one pixel. In still another embodiment, the pixel group may be a prediction mode block. That is, the pixel group may include all the pixels of the prediction mode block.

In partitioning the prediction mode block into the pixel groups, the decoding apparatus may derive information on the partitioning structure from the prediction mode block and the neighboring blocks or receive the information from the encoding apparatus.

The decoding apparatus may determine a partitioning structure according to the dimensions (the number of horizontal pixels, the number of vertical pixels, the product of the number of horizontal pixels and the number of vertical pixels, etc.) of the prediction mode block. For example, a horizontal partitioning structure in which "number of horizontal pixels">"number of vertical pixels" may be used, or conversely, a vertical partitioning structure may be used. Also, the decoding apparatus may set the number of pixel groups according to the product of the number of horizontal pixels and the number of vertical pixels.

The decoding apparatus may use predetermined partitioning information according to an appointment between the encoding apparatus and the decoding apparatus. For example, the prediction mode block may always be partitioned into a plurality of sub-blocks of the same size horizontally or vertically. The number of sub-blocks may be determined according to the dimensions of the prediction mode block. Alternatively, the prediction mode block may always be partitioned into sub-blocks of a fixed size such as 4×4.

The decoding apparatus may use a partitioning structure of a block near the prediction mode block. For example, when there is a neighboring block of the same size as the prediction mode block, a partitioning structure of the neighboring block may be used or referenced without change. As another example, as shown in FIG. 7(a), when a plurality of blocks are on the left side of the prediction mode block, the prediction mode block may be horizontally partitioned by extending a horizontal boundary line between the blocks. Similarly, if a plurality of blocks are on the top side of the prediction mode block, the prediction mode block may be partitioned vertically by extending a vertical boundary line between the plurality of blocks.

As described above, the intra-predictor 442 of the image decoding apparatus may determine the partitioning structure of the prediction mode block on the basis of a combination of all or some of the dimensions of the prediction mode block, a predetermined partitioning structure according to an appointment between an encoding apparatus and a decoding apparatus, and a partitioning structure of a block near the prediction mode block.

In another embodiment of the present invention, information on the partitioning structure of the prediction mode block may be transferred from the encoding apparatus.

In another embodiment of the present invention, a list of partitioning structures of the prediction mode block may be generated, and a partitioning structure may be selected from the list.

Figure 7:
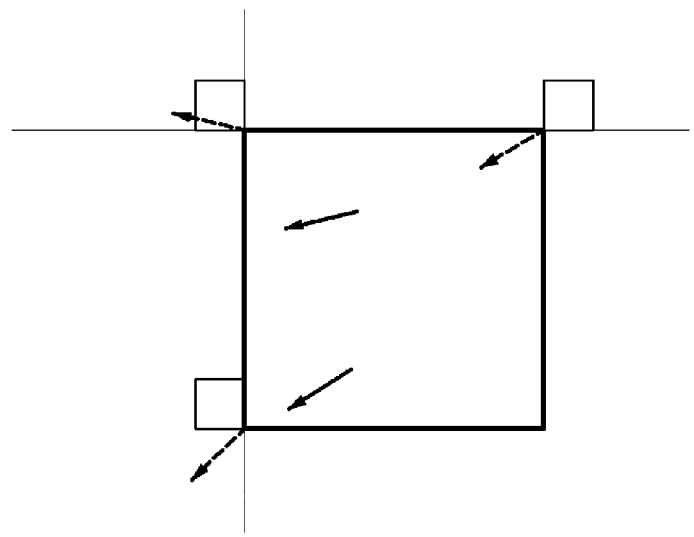
FIG. 7 is an exemplary diagram illustrating the derivation of a prediction mode according to an embodiment of the present invention.
Figure 7:
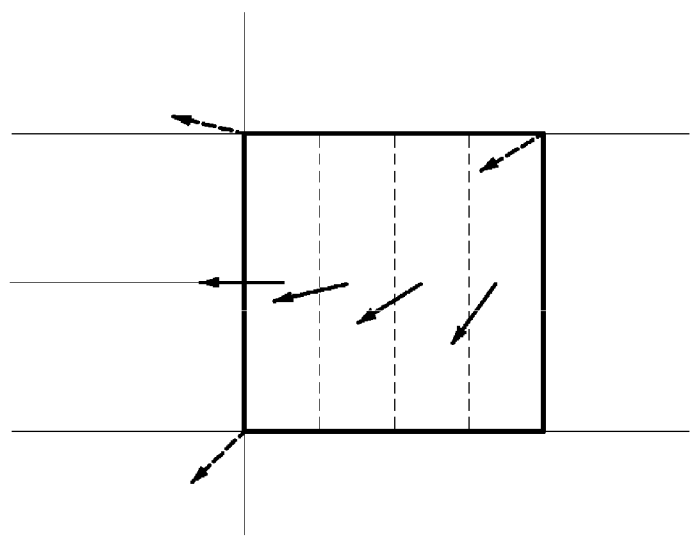

FIG. 7 is an exemplary diagram illustrating prediction mode derivation according to an embodiment of the present invention.

The prediction mode derivation unit 504 derives a prediction mode for the current block using a reference position of a neighboring block in units of a pixel group.

In an example of FIG. 7, a rectangle indicated by a thick solid line indicates a prediction mode block, and a dotted line indicates a unit in which the prediction mode block is partitioned and in which intra prediction is performed, that is, a partition block (a group of pixels in the form of a block). FIG. 7(a) illustrates a case in which a prediction mode block is equally partitioned into two parts horizontally, and FIG. 7(b) illustrates a case in which the prediction mode block is equally partitioned into four parts vertically.

The prediction mode derivation unit 504 may derive a prediction mode of the prediction mode block using the prediction mode indicated by at least two reference positions. In an example of FIG. 7, the prediction mode derivation unit 504 uses a prediction mode of three neighboring reference positions in order to derive the prediction mode of the prediction mode block.

In an example of FIG. 7, a dotted arrow indicates the prediction mode of the neighboring block, and a solid arrow indicates the prediction mode of each partition block derived from the prediction mode of the neighboring block. The setting of the neighboring reference position and the derivation of the prediction mode may be performed by the encoding apparatus and the decoding apparatus in the same manner.

The prediction mode derivation unit 504 derives the intra prediction mode of each partition block by using at least one of the reference positions on the basis of the position of each partition block in the current block. The intra prediction mode of the partition block is highly likely to be similar to the intra prediction mode of a nearby reference position. Therefore, the prediction mode of the corresponding partition block is determined to be affected by a reference position at a close distance from the partition block. For example, a weight for each reference position may be determined according to a distance between each partition block and the reference position. The closer the distance, the greater the weight that can be assigned. Here, the position of the partition block may be the position of a center pixel of the partition block.

The prediction mode derivation unit 504 may derive an intra prediction direction for each partition block by weighted-summing the prediction directions of the reference positions on the basis of the weight for each reference position. Alternatively, a prediction mode closest to the weighted sum among all the intra prediction modes may be derived as a prediction mode of a corresponding partition block.

In another embodiment of the present invention, when a pixel group includes one pixel, the intra prediction mode may be derived in units of each pixel in the prediction mode block.

Figure 8:
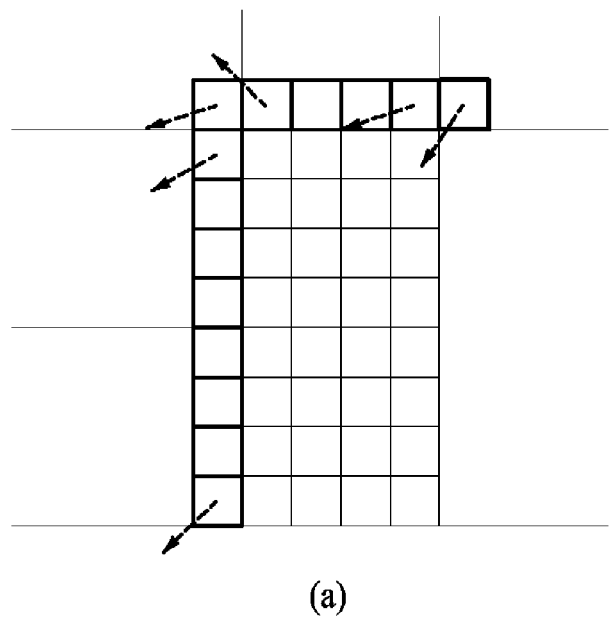
FIG. 8 is an exemplary diagram illustrating the derivation of a prediction mode according to another embodiment of the present invention.
Figure 8:
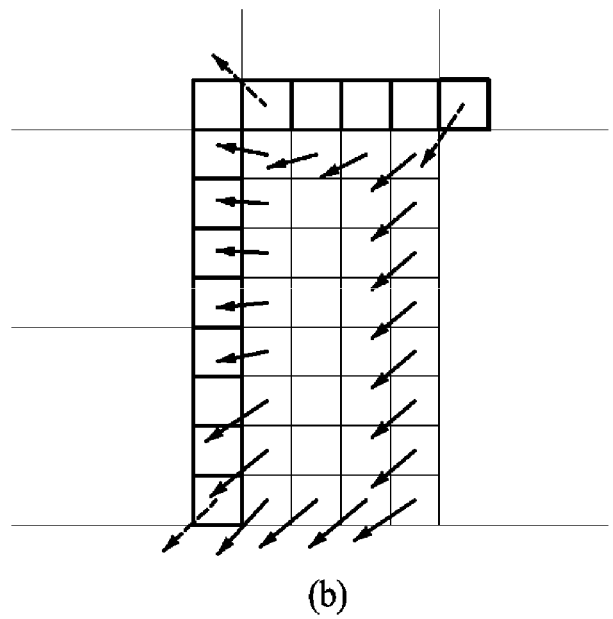

FIG. 8 is an exemplary diagram illustrating prediction mode derivation according to another embodiment of the present invention.

In an example of FIG. 8, a rectangle indicated by a thin line refers to one pixel of the current block that performs intra prediction.

In an example of FIG. 8(*a*), a dotted arrow indicates the prediction mode of each neighboring pixel, and in the example of FIG. 8(*b*), a neighboring pixel including three dotted arrows is a reference position that is set for reference. With reference to the prediction mode of the three reference positions, the prediction mode derivation unit 504 may determine an intra prediction mode for each pixel in the current block as illustrated in FIG. 8(*b*).

The prediction mode derivation unit 504 derives the intra prediction mode of a corresponding pixel using at least one of the reference positions on the basis of the position of each pixel in the current block. The prediction mode of the corresponding pixel is determined to be affected by a reference position at a close distance from the partition block. For example, a weight for each reference position may be determined according to a distance between each pixel and the reference position.

The prediction mode derivation unit 504 may derive an intra prediction mode of a corresponding pixel by weighted-summing the prediction directions of the reference positions on the basis of the weight for each reference position. Alternatively, a prediction mode closest to the weighted sum among all the intra prediction modes may be derived as a prediction mode of a corresponding pixel.

Meanwhile, when the prediction mode of the set reference position is not useful, the prediction mode derivation unit 504 may replace the reference position with a new position near the prediction mode block. Also, when the prediction modes of all the reference positions are not useful, the prediction mode for the current block may be determined as one of the prediction modes preset between the encoding apparatus and the decoding apparatus.

According to an embodiment of the present invention described above, multiple partitioning units for the prediction mode block, such as one pixel, one line, and a partition block may have different prediction modes. It is not required to individually signal information on the intra prediction mode for each portioning unit.

Meanwhile, in another embodiment, when a pixel group is the entire prediction mode block, the prediction mode derivation unit 504 may derive one intra prediction mode for the prediction mode block from intra prediction modes of a plurality of reference positions. For example, the intra prediction mode for the entire current block may be derived by averaging the intra prediction modes (prediction directions) of the plurality of reference positions.

A predicted sample generation unit 506 according to an embodiment generates predicted samples by predicting the prediction mode block (the current block) in units of a pixel group according to the intra prediction mode derived by the prediction mode derivation unit 504.

Figure 9:
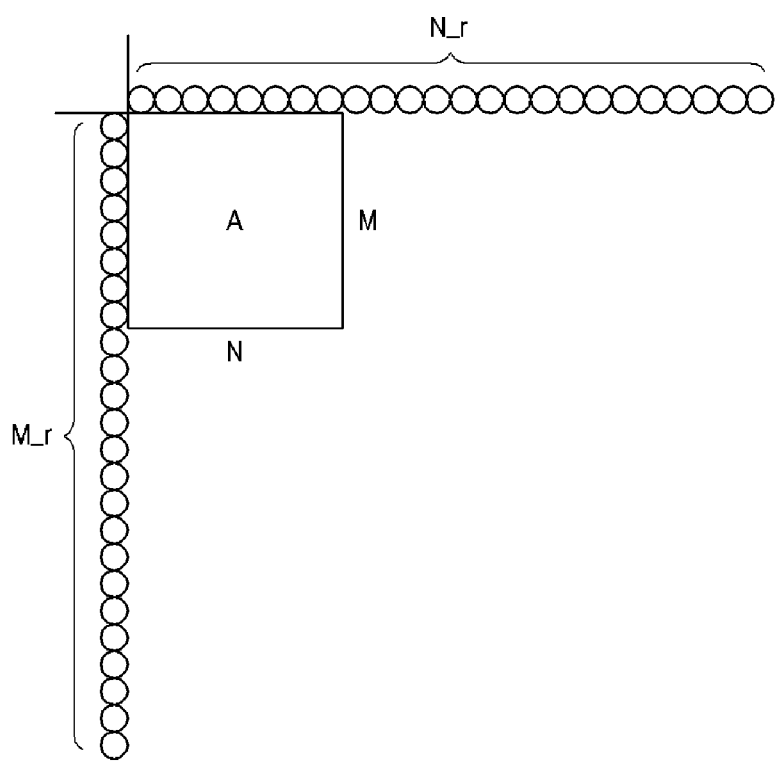
FIG. 9 is an exemplary diagram showing the position of a previously reconstructed reference sample used to generate an intra-predicted sample according to an embodiment of the present invention.

FIG. 9 is an exemplary diagram showing the position of a previously reconstructed reference sample used to generate an intra-predicted sample according to an embodiment of the present invention In an example of FIG. 9, portions indicated by circles refer to reference samples included in pre-reconstructed blocks referenced by the current block A. The range of the reference samples may be extended according to the usefulness of the reference sample corresponding to the decoding order and the range of the intra prediction mode. Also, the intra-predictor 442 may determine prediction ranges M_r and N_r according to M and N, which are the sizes of the current block A, and the range of the intra prediction mode.

The predicted sample generation unit 506 may generate predicted samples from sample values of pre-reconstructed reference samples near the prediction mode block as illustrated in FIG. 9 by using the intra prediction mode derived in units of a pixel group.

In the case of an embodiment in which an intra prediction mode is derived for each partition block obtained by partitioning the prediction mode block, the predicted sample generation unit 506 determines reference samples for target pixels to be predicted in a corresponding partition block according to the intra prediction mode derived for the partition block. Also, the target pixels are predicted using the sample values of the determined reference samples.

In the case of another embodiment in which an intra prediction mode is derived in units of a pixel in the prediction mode block, the predicted sample generation unit 506 determines pre-reconstructed reference samples using the intra prediction mode derived for a corresponding pixel and predicts the corresponding pixel using the sample values of the determined reference samples.

In the case of another embodiment in which one intra prediction mode is derived for the entirety of the prediction mode block, the predicted sample generation unit 506 determines pre-reconstructed reference samples for target pixels to be predicted in the prediction mode block using the intra prediction mode of the prediction mode block. Also, the target pixels are predicted using the sample values of the determined reference samples.

Figure 10:
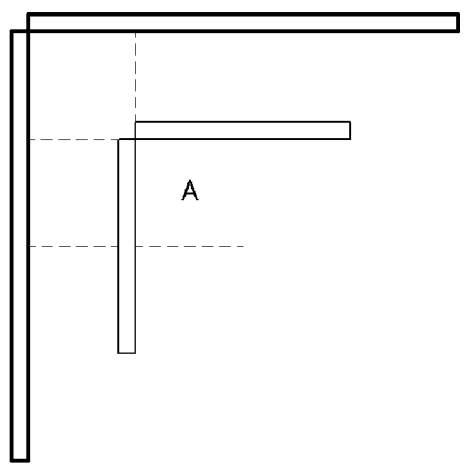
FIG. 10 is an exemplary diagram showing the position of a previously reconstructed reference sample used to generate an intra-predicted sample according to another embodiment of the present invention.

FIG. 10 is an exemplary diagram showing the position of a previously reconstructed reference sample used to generate an intra-predicted sample according to another embodiment of the present invention.

In the case of an embodiment in which the prediction mode block is partitioned into K (K is a natural number) partition blocks (dashed rectangles), the predicted sample generation unit 506 performs intra prediction using sample values of reference samples as illustrated in FIG. 10.

In an example of FIG. 10, a rectangle indicated by a thick line is the position of a reference sample with respect to a boundary of the prediction mode block, and a rectangle indicated by a thin line is the position of a reference sample with respect to a boundary of partition block A.

When intra prediction is performed on partition block A in the prediction mode block, the predicted sample generation unit 506 may generate a predicted sample using sample values of reference samples at a boundary of the prediction mode block or may use pre-reconstructed partition block as a reference sample with respect to a boundary of partition block A. Which reference samples to use may be determined by an appointment between the encoding apparatus and the decoding apparatus. Alternatively, information indicating which reference samples to use may be signaled in units of blocks such as each partition block and the prediction mode block.

In order to use the pre-reconstructed partition block in the prediction mode block as a reference sample, it is necessary to sequentially reconstruct partition blocks in the prediction mode block. That is, a first partition block in the prediction mode block is predicted in a predefined order such as a raster scan order, and then the first partition block is reconstructed by adding corresponding residual signals to the predicted partition block. Samples in the reconstructed partition block are used as reference samples for predicting a subsequent partition block adjacent to the reconstructed partition block. For example, in an example of FIG. 10, the decoding apparatus may predict and reconstruct an upper left partition block by a prediction mode derived corresponding to the block (i.e., generate a final reconstructed sample in combination with the residual) and then may use the reconstructed samples in the upper left partition block when reconstructing an upper right partition block.

In another embodiment, a predicted sample in a previously predicted partition block may be used as a reference sample for predicting a subsequent partition block. That is, the predicted sample generation unit 506 predicts any partition block in the prediction mode block in a predefined order such as a raster scan order. Then, pixels in the subsequent partition block are predicted using predicted samples in the predicted partition block (which are not reconstructed blocks generated through the addition of the predicted sample and the residual signal).

The intra prediction mode derivation technique as described above may be used for both a luma block and a chroma block. Alternatively, an intra prediction mode for a chroma block may be determined from an intra prediction mode of a luma block using an intra direct mode (DM).

Figure 11:
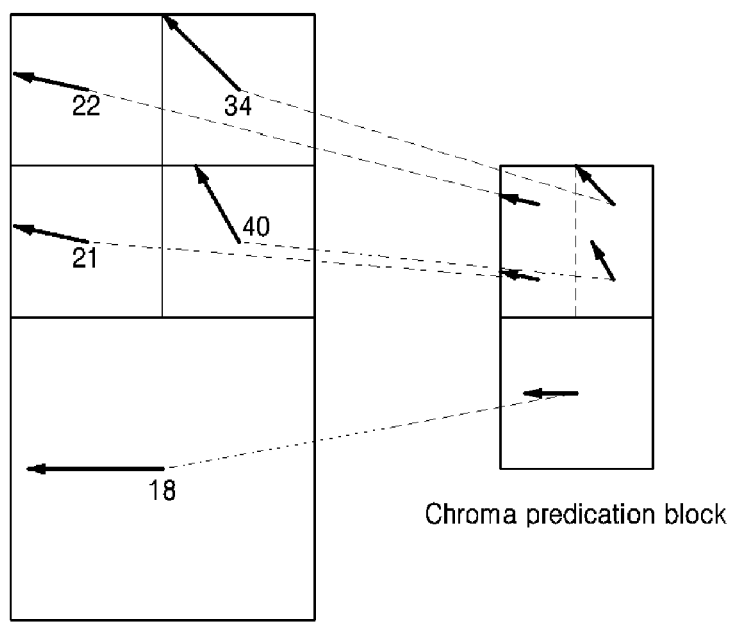
FIG. 11 is an exemplary diagram illustrating the intra prediction of a chroma block according to an embodiment of the present invention.

FIG. 11 is an exemplary diagram illustrating the intra prediction of a chroma block according to an embodiment of the present invention.

As illustrated in FIG. 11, an intra prediction mode derived for each pixel group in a luma block may be set as an intra prediction mode for a pixel group at a corresponding position in a chroma block. The intra-predictor 442 performs intra prediction on each pixel group in the chroma block using an intra prediction mode corresponding to the pixel group.

Meanwhile, when color components have different resolutions, the intra-predictor 442 may use an intra prediction mode of a luma block sampled according to a specific sampling method as a prediction mode of a chroma block.

Figure 12:
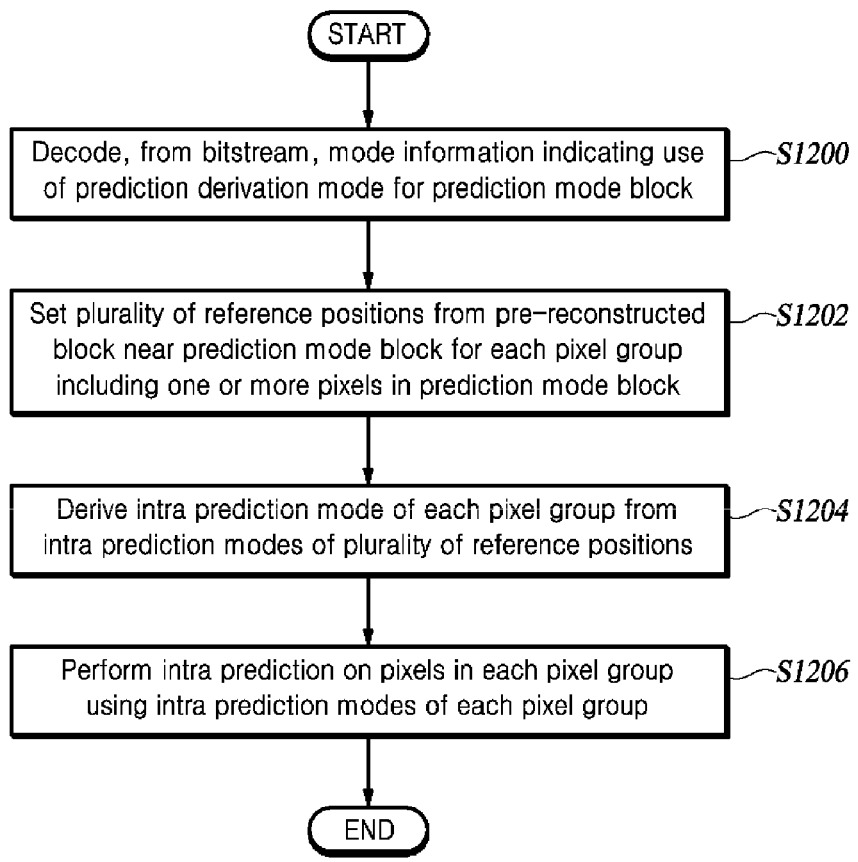
FIG. 12 is a flowchart of an intra prediction method according to an embodiment of the present invention.

FIG. 12 is a flowchart of an intra prediction method according to an embodiment of the present invention.

An intra prediction device 500 according to this embodiment decodes, from a bitstream, mode information indicating the use of a prediction derivation mode for a prediction mode block (S1200). Here, the prediction mode block refers to a block unit in which prediction information including the prediction derivation mode (hereinafter referred to as "derivation mode") is transmitted. Hereinafter, for convenience of description, a current block indicates a prediction mode block.

In order to use the derivation mode, the encoding apparatus may transmit mode information regarding whether to use the derivation mode by using a bitstream, and the decoding apparatus may determine whether to apply the derivation mode using the corresponding information. The mode information may be information in the form of a flag indicating whether the prediction derivation mode is used. Alternatively, the mode information may be information in the form of an index for indicating one of a plurality of intra prediction modes that further includes the derivation mode as a new intra prediction mode.

When the derivation mode according to this embodiment is applied, the intra prediction device 500 may partition the prediction mode block into pixel groups including one or more pixels. Pixel groups including a plurality of pixels are collectively expressed as a partition block or a sub-block, and intra prediction may be performed in units of each partition block. Therefore, the prediction mode block in which the derivation mode is decoded may not have the same level as the block in which the intra prediction is performed.

According to the partitioning structure of the prediction mode block, the pixel group may be in the form of a block such as a square, a rectangle, or a triangle or in a block form of a line unit such as M×1 or 1×N. Meanwhile, the pixel groups obtained through the partitioning may have the same size and form.

In another embodiment of the present invention, the pixel group may include only one pixel. In still another embodiment, the pixel group may be a prediction mode block. That is, the pixel group may include all the pixels of the prediction mode block.

The intra prediction device 500 sets a plurality of reference positions from a pre-reconstructed block near the prediction mode block for each pixel group including one or more pixels in the prediction mode block (S1202).

The intra prediction device 500 may determine a reference position using at least one of the dimensions of a prediction mode block, a position predetermined according to an appointment between an encoding apparatus and a decoding apparatus, and a partitioning structure of a block near a prediction mode block.

Meanwhile, alternatively, information on available reference positions may be transmitted from the encoding apparatus to the decoding apparatus. In this case, the intra prediction device 500 determines reference positions using the received information.

The intra prediction device 500 derives an intra prediction mode of each pixel group from intra-prediction modes of the plurality of reference positions (S1204).

The intra prediction device 500 derives the intra prediction mode of each partition block by using at least one of the reference positions on the basis of the position of each partition block in the current block. That is, the prediction mode of the corresponding partition block is determined to be affected by a reference position at a close distance from the partition block. For example, a weight for each reference position may be determined according to a distance between each partition block and the reference position. The closer the distance, the greater the weight that can be assigned.

The intra prediction device 500 may derive an intra prediction direction for each partition block by weighted-summing the prediction directions of the reference positions on the basis of the weight for each reference position. Alternatively, a prediction mode closest to the weighted sum among all the intra prediction modes may be derived as a prediction mode of a corresponding partition block.

Meanwhile, when the prediction mode of the reference position is not useful, the intra prediction device 500 may replace the reference position with a new position near the prediction mode block. Also, when the prediction modes of all the reference positions are not useful, the prediction mode for the current block may be determined as one of the prediction modes preset between the encoding apparatus and the decoding apparatus.

The setting of the neighboring reference position and the derivation of the prediction mode may be performed by the encoding apparatus and the decoding apparatus in the same manner.

The intra prediction device 500 may derive the intra prediction mode of the current block to be the same as that of its neighboring blocks. The intra prediction device 500 first selects a plurality of directions from the neighboring blocks and then selects the mode of one of the directions as the intra prediction mode of the current block or may calculate the intra prediction mode of the current block from prediction modes of a plurality of neighboring blocks.

The intra prediction device 500 performs intra prediction on pixels in each pixel group using an intra prediction mode of the corresponding pixel group (S1206).

The intra prediction device 500 may generate predicted samples from sample values of the pre-reconstructed reference samples near the prediction mode block using an intra prediction mode derived in units of a pixel group.

In the case of an embodiment in which an intra prediction mode is derived for each partition block obtained by partitioning the prediction mode block, the predicted sample generation unit 506 determines reference samples for target pixels to be predicted in a corresponding partition block according to the intra prediction mode derived for the partition block. Also, the target pixels are predicted using the sample values of the determined reference samples.

In order to use the pre-reconstructed partition block in the prediction mode block as a reference sample, it is necessary to sequentially reconstruct partition blocks in the prediction mode block. That is, a first partition block in the prediction mode block is predicted in a predefined order such as a raster scan order, and then the first partition block is reconstructed by adding corresponding residual signals to the predicted partition block. Samples in the reconstructed partition block may be used as reference samples for predicting a subsequent partition block adjacent to the reconstructed partition block.

As described above, according to this embodiment, it is possible to improve the compression performance of the image encoding and decoding apparatus by providing an intra prediction device and method for deriving an intra prediction mode of a current block with reference to an intra prediction mode of a previously reconstructed neighboring block, performing intra prediction based on the derived intra prediction mode, and generating a predicted sample for the current block.

In general, when a natural image is partitioned into blocks for intra prediction, one block and its neighboring blocks have similar image characteristics. Therefore, the intra prediction modes may be similar. In consideration of such a feature, there is an intra prediction method using a Most Probable Mode (MPM) list generated based on the prediction modes of left and upper adjacent blocks with respect to the current block.

First, the encoding apparatus transmits an MPM flag indicating whether the prediction mode of the current block is generated from the MPM list. When the prediction mode of the current block is included in the MPM list, the encoding apparatus transmits, to the decoding apparatus, an MPM index indicating the intra prediction mode of the current block among the intra prediction modes of the MPM list. The decoding apparatus may select a prediction mode from the MPM list using the received index and may perform intra prediction on the current block. Meanwhile, when the prediction mode of the current block is not included in the MPM list, the encoding apparatus may transmit, to the decoding apparatus, residual mode information indicating the prediction mode of the current block among residual prediction modes excluding the prediction modes included in the MPM list.

In another embodiment of the present invention, a method of determining an intra prediction mode of a prediction mode block using MPM is disclosed. The intra-predictor 442 creates an MPM list on the basis of the prediction mode block. That is, the intra-predictor 442 generates an MPM list using intra prediction modes of blocks (left and upper adjacent blocks) near the prediction mode block.

Meanwhile, the intra-predictor 442 partitions the prediction mode block into a plurality of sub-blocks. The partitioning method may be the same as described above in the prediction derivation mode. Also, the MPM list created based on the prediction mode block is shared with all the sub-blocks in the prediction mode block. That is, the same MPM list is used for the plurality of sub-blocks.

As an example, the intra prediction mode of each sub-block in the prediction mode block may be determined from the MPM list. In this case, an MPM index for each sub-block may be signaled from the encoding apparatus to the decoding apparatus. The intra-predictor 442 of the decoding apparatus may determine an intra prediction mode of a corresponding sub-block from the shared MPM list through the received MPM index. An intra prediction mode determined for a previously predicted sub-block in the prediction mode block may not be used as an intra prediction mode of a subsequent sub-block. To this end, the intra prediction mode for the previously predicted sub-block may be deleted from the MPM list. In this way, it is possible to reduce the total number of bits required to signal MPM indices for all the sub-blocks in the prediction mode block.

As another example, information on the intra prediction modes for the sub-blocks in the prediction mode block (MPM flags and MPM indices corresponding to the MPM flags or residual mode information) may be signaled from the encoding apparatus to the decoding apparatus. The intra-predictor 442 of the decoding apparatus determines the intra prediction mode of the sub-blocks using the received information. In this case, an intra prediction mode determined for a previously predicted sub-block in the prediction mode block may not be used as an intra prediction mode of a subsequent sub-block. To this end, the intra prediction mode determined for the previously predicted sub-block may be deleted from the MPM list or may be deleted from a residual prediction mode list. Thus, it is possible to reduce the total number of bits required to signal MPM indices and residual mode information for all the sub-blocks in the prediction mode block.

Although it has been described that each process is sequentially executed in each flowchart according to embodiments, the present invention is not limited thereto. In other words, the processes of the flowcharts may be changed or one or more of the processes may be performed in parallel, and the flowcharts are not limited to a time-series order.

Meanwhile, various functions or methods described in the present disclosure may be implemented as instructions stored in a non-transitory recording medium that can be read and executed by one or more processors. The non-transitory recording medium includes, for example, any type of recording device in which data is stored in a form readable by a computer system. For example, the non-transitory recording medium includes a storage medium such as an erasable programmable read-only memory (EPROM), a flash drive, an optical drive, a magnetic hard drive, and a solid-state drive (SSD).

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

REFERENCE NUMERALS

| | |
|---|---|
| 120, 440: Predictor | 130: Subtractor |
| 170, 450: Adder | 180, 460: Filter unit |
| 442: Intra-predictor | |
| 500: Intra prediction device | 502: Reference position setting unit |
| 504: Prediction mode derivation unit | |
| 506: Predicted sample generation unit | |

CROSS-REFERENCE TO RELATED APPLICATION

This application is a National Phase application filed under 35 USC 371 of PCT Application No. PCT/KR2020/003836 with an International Filing Date of Mar. 20, 2020, which claims priority, under 35 U.S.C § 119(a), to Patent Application No. 10-2019-0031727, filed in Korea on Mar. 20, 2019, and Patent Application No. 10-2019-0034277, filed in Korea on Mar. 20, 2020, the entire contents of which are incorporated herein by reference. In addition, this patent application claims priority in countries other than the United States for the same reason as above, and the entire contents thereof are incorporated herein by reference.

What is claimed is:

1. An intra prediction method used by an intra prediction device, the method comprising:
    decoding, from a bitstream, mode information indicating use of a prediction derivation mode for a prediction mode block, wherein the prediction derivation mode indicates that an intra prediction mode is derived and used for the prediction mode block;
    deriving an intra prediction mode of each pixel group from intra prediction modes of pre-reconstructed reference pixels at a plurality of positions near the prediction mode block for each pixel group including one or more pixels in the prediction mode block; and
    intra-predicting the pixels in each pixel group using the intra prediction mode of each pixel group,
    wherein the intra prediction mode of each pixel group is derived by assigning weights to intra prediction modes of the reference pixels of each pixel group according to distances from the reference pixels and weighted-summing the intra prediction modes of the reference pixels.

2. The method of claim 1, further comprising:
    setting positions of the reference pixels for each pixel group from a pre-reconstructed block near the prediction mode block.

3. The method of claim 2, wherein the positions of the reference pixels are determined based on some or all of a method of performing determining a position using dimensions of the prediction mode block, a method of performing setting a position determined according to a predetermined appointment, and a method of performing determining a position using a partitioning structure of a block near the prediction mode block.

4. The method of claim 1, wherein the mode information is a flag indicating whether the prediction derivation mode is used or an index indicating the prediction derivation mode among a plurality of intra prediction modes including the prediction derivation mode.

5. The method of claim 1, wherein the intra prediction mode of each pixel group is derived from intra-prediction modes of one or more of the reference pixels on the basis of a corresponding position of each pixel group in the prediction mode block.

6. The method of claim 1, wherein each pixel group includes one pixel.

7. The method of claim 1, wherein each pixel group is obtained by partitioning the prediction mode block in at least one of a horizontal direction or a vertical direction and is one of sub-blocks including a plurality of pixels.

8. The method of claim 7, wherein the sub-blocks are partitioned into the same form and size as each other.

9. The method of claim 7, wherein the prediction mode block is partitioned into the sub-blocks on the basis of at least one of the dimensions of the prediction mode block, a predefined scheme according to a predetermined appointment, and a partitioning form of a block near the prediction mode block.

10. The method of claim 1, further comprising:
    decoding information on a partitioning structure of the prediction mode block from the bitstream and generating each pixel group using the information on the partitioning structure.

11. The method of claim 1, wherein the intra-predicting comprises generating predicted samples for the pixels of each pixel group using pre-constructed pixels adjacent to the predication mode block.

12. The method of claim 1, wherein the intra-predicting comprises sequentially reconstructing each pixel group included in the prediction mode block, and wherein pre-reconstructed pixels in a pre-reconstructed pixel group in the prediction mode block are used to perform intra prediction on a pixel group adjacent to the pre-reconstructed pixel group.

13. The method of claim 1, wherein the intra-predicting comprises sequentially performing intra prediction on each pixel group included in the prediction mode block, and wherein predicted pixels in a pre-predicted pixel group in the prediction mode block are used to perform intra prediction on a pixel group adjacent to the pre-reconstructed pixel group.

14. An intra prediction device comprising:
an entropy decoding unit configured to decode, from a bitstream, mode information indicating use of a prediction derivation mode for a prediction mode block, wherein the prediction derivation mode indicates that an intra prediction mode is derived and used for the prediction mode block;
a prediction mode derivation unit configured to derive an intra prediction mode of each pixel group from intra prediction modes of pre-reconstructed reference pixels at a plurality of positions near the prediction mode block for each pixel group including one or more pixels in the prediction mode block; and
a predicted sample generation unit configured to perform intra prediction on the pixels in each pixel group using the intra prediction mode of each pixel group,
wherein the intra prediction mode of each pixel group is derived by assigning weights to intra prediction modes of the reference pixels of each pixel group according to distances from the reference pixels and weighted-summing the intra prediction modes of the reference pixels.

15. The intra prediction device of claim 14, further comprising a reference position setting unit configured to set positions of the reference pixels for each pixel group from a pre-reconstructed block near the prediction mode block.

16. The intra prediction device of claim 14, wherein a partitioning structure for partitioning the prediction mode block into each pixel group is determined based on at least one of the dimensions of the prediction mode block, a predefined scheme according to a predetermined appointment, and a partitioning structure of a block near the prediction mode block, or is determined based on information decoded from the bitstream by the entropy decoding unit.

* * * * *